United States Patent
Van Blarcom et al.

(10) Patent No.: US 9,908,448 B2
(45) Date of Patent: Mar. 6, 2018

(54) COMPUTER SUPPORT ASSEMBLY

(71) Applicants: Frankie Van Blarcom, Action, CA (US); Michelle Van Blarcom, Action, CA (US)

(72) Inventors: Frankie Van Blarcom, Action, CA (US); Michelle Van Blarcom, Action, CA (US)

( * ) Notice: Subject to any disclaimer, the term of this patent is extended or adjusted under 35 U.S.C. 154(b) by 25 days.

(21) Appl. No.: 15/080,806

(22) Filed: Mar. 25, 2016

(65) Prior Publication Data

US 2017/0274806 A1 Sep. 28, 2017

(51) Int. Cl.
| | |
|---|---|
| *A47B 96/06* | (2006.01) |
| *B60N 3/00* | (2006.01) |
| *B60R 11/02* | (2006.01) |
| *B60R 11/00* | (2006.01) |

(52) U.S. Cl.
CPC .......... *B60N 3/005* (2013.01); *B60R 11/0252* (2013.01); *B60R 2011/001* (2013.01); *B60R 2011/0082* (2013.01)

(58) Field of Classification Search
CPC .............. B60N 3/005; B60R 2011/005; B60R 2011/0082; B60R 2011/001; B60R 11/0252
USPC ........ 108/44; 248/205.1, 441.1, 447.1, 447.2
See application file for complete search history.

(56) References Cited

U.S. PATENT DOCUMENTS

| | | | | |
|---|---|---|---|---|
| 893,930 | A * | 7/1908 | Lederman | A47K 3/122 108/47 |
| 2,314,550 | A * | 3/1943 | Olman | B60N 3/005 108/44 |
| 2,487,536 | A * | 11/1949 | Fiscus | B43L 3/008 108/44 |
| 2,856,251 | A * | 10/1958 | Garrison | B60N 3/005 108/149 |
| 2,921,824 | A * | 1/1960 | Richter | B60N 3/004 108/10 |
| 3,556,589 | A * | 1/1971 | Messier | A47C 7/425 108/44 |
| 3,643,606 | A * | 2/1972 | Vise | B60N 3/005 108/44 |
| 5,046,433 | A * | 9/1991 | Kramer | B60N 3/004 108/44 |

(Continued)

FOREIGN PATENT DOCUMENTS

| | | | | |
|---|---|---|---|---|
| CA | 2194915 | A1 * | 7/1998 | B60N 3/005 |
| CA | 2340127 | A1 * | 3/2000 | B60N 3/005 |

(Continued)

*Primary Examiner* — Kimberly T Wood

(57) ABSTRACT

A computer support assembly that is steering wheel mountable includes a frame that is disposable upon a wheel of a steering wheel. Opposing side edges of the frame are configured to abut opposing sides of the wheel. A pair of hooks is coupled to and extends transversely from an upper edge of the frame. The hooks are configured to reversibly couple to a top of the wheel. A tray is hingedly coupled to a lower edge of the frame. The hooks are positioned on the frame such that the frame is couplable to the wheel. The opposing side edges of the frame abut the opposing sides of the wheel to stabilize the frame. The tray is hingedly coupled to the frame such that the tray is positionable transverse from the frame for use. The tray also is positionable substantially parallel to the frame for storage.

17 Claims, 5 Drawing Sheets

(56) References Cited

U.S. PATENT DOCUMENTS

| | | | |
|---|---|---|---|
| 5,060,581 A * | 10/1991 | Malinski | B60N 3/005 |
| | | | 108/44 |
| 5,177,665 A * | 1/1993 | Frank | B60R 11/0252 |
| | | | 108/44 |
| 5,413,035 A * | 5/1995 | Fernandez | B60N 3/005 |
| | | | 100/44 |
| 5,542,314 A * | 8/1996 | Sullivan | B60R 11/0252 |
| | | | 211/119 |
| 5,662,047 A * | 9/1997 | Metcalf | B60N 3/005 |
| | | | 108/44 |
| D393,237 S | 4/1998 | Mondo, Jr. | |
| 5,845,585 A * | 12/1998 | Meeus | B60N 3/005 |
| | | | 108/165 |
| 6,062,145 A | 5/2000 | Lin | |
| 6,148,738 A | 11/2000 | Richter | |
| 6,192,806 B1 * | 2/2001 | Chen | B60N 3/005 |
| | | | 108/44 |
| 7,216,789 B2 | 5/2007 | Caradimos | |
| 7,363,865 B2 * | 4/2008 | Rubenstein | B60N 3/005 |
| | | | 108/165 |
| 8,096,517 B1 | 1/2012 | Hamilton | |
| 9,021,963 B1 * | 5/2015 | Jacobsen | A45C 9/00 |
| | | | 108/44 |
| 2006/0032410 A1* | 2/2006 | Miller | B60N 3/005 |
| | | | 108/44 |
| 2006/0107878 A1* | 5/2006 | Cassata | B60N 3/005 |
| | | | 108/44 |
| 2008/0257228 A1 | 10/2008 | Chisler et al. | |
| 2011/0057006 A1 | 3/2011 | Smith | |

FOREIGN PATENT DOCUMENTS

| | | | | |
|---|---|---|---|---|
| DE | 9209394 U1 * | 12/1992 | | B60R 11/0252 |
| DE | 4233889 A1 * | 4/1994 | | B60N 3/005 |
| FR | 2154349 A1 * | 5/1973 | | B43L 3/008 |
| FR | 2724883 A1 * | 3/1996 | | B60N 3/005 |
| FR | 2909328 A1 * | 6/2008 | | B60N 3/005 |
| WO | WO 2005028246 A1 * | 3/2005 | | B60N 3/005 |

* cited by examiner

COMPUTER SUPPORT ASSEMBLY

BACKGROUND OF THE DISCLOSURE

Field of the Disclosure

The disclosure relates to support assemblies and more particularly pertains to a new support assembly that is steering wheel mountable.

SUMMARY OF THE DISCLOSURE

An embodiment of the disclosure meets the needs presented above by generally comprising a frame that is disposable upon a wheel of a steering wheel. Opposing side edges of the frame are configured to abut opposing sides of the wheel. A pair of hooks is coupled to and extends transversely from an upper edge of the frame. The hooks are configured to reversibly couple to a top of the wheel. A tray is hingedly coupled to a lower edge of the frame. The hooks are positioned on the frame such that the frame is couplable to the wheel. The opposing side edges of the frame abut the opposing sides of the wheel to stabilize the frame. The tray is hingedly coupled to the frame such that the tray is positionable transverse from the frame for use. The tray also is positionable substantially parallel to the frame for storage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
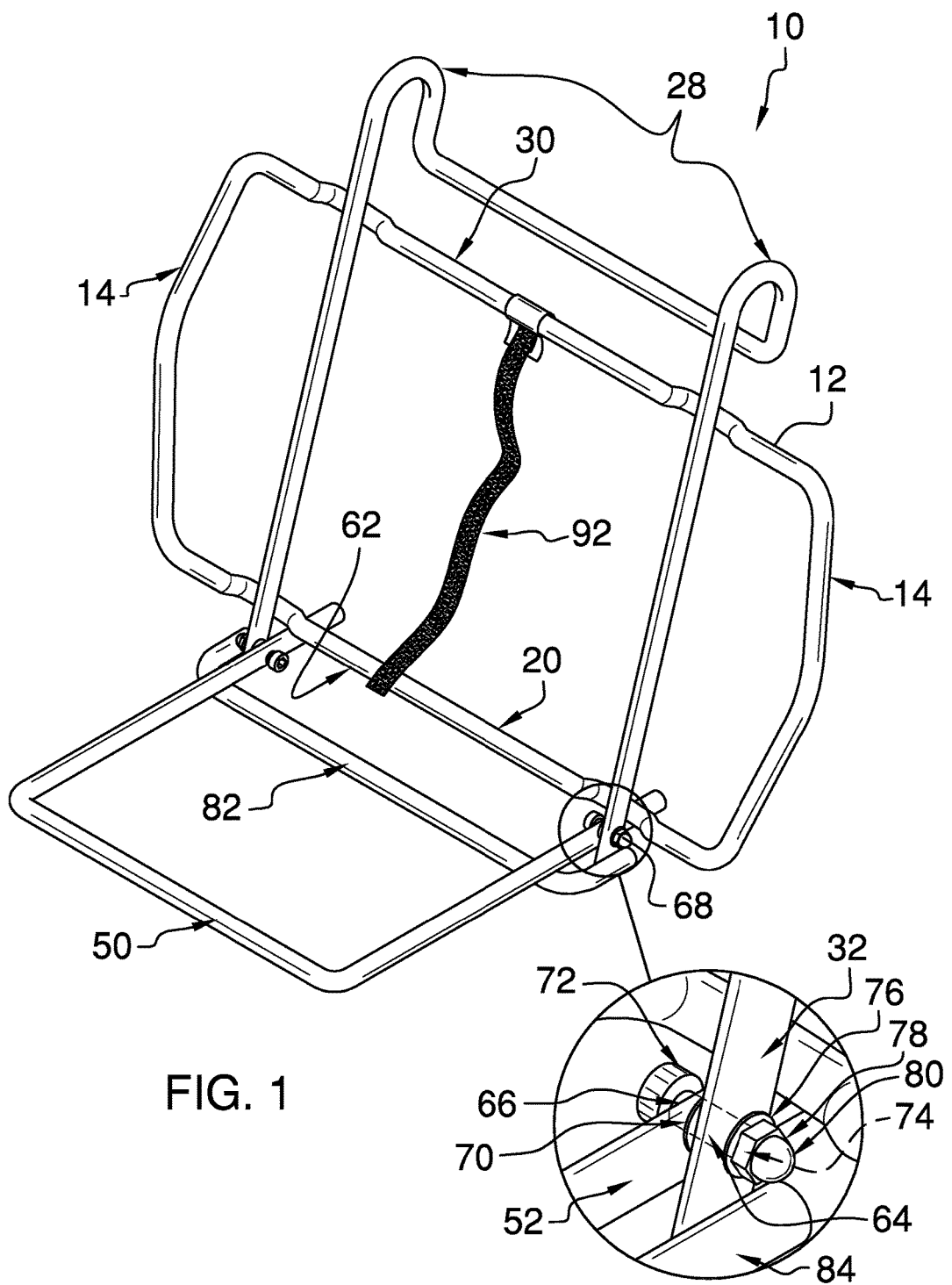
FIG. 1 is an isometric perspective view of a computer support assembly according to an embodiment of the disclosure.
Figure 2:
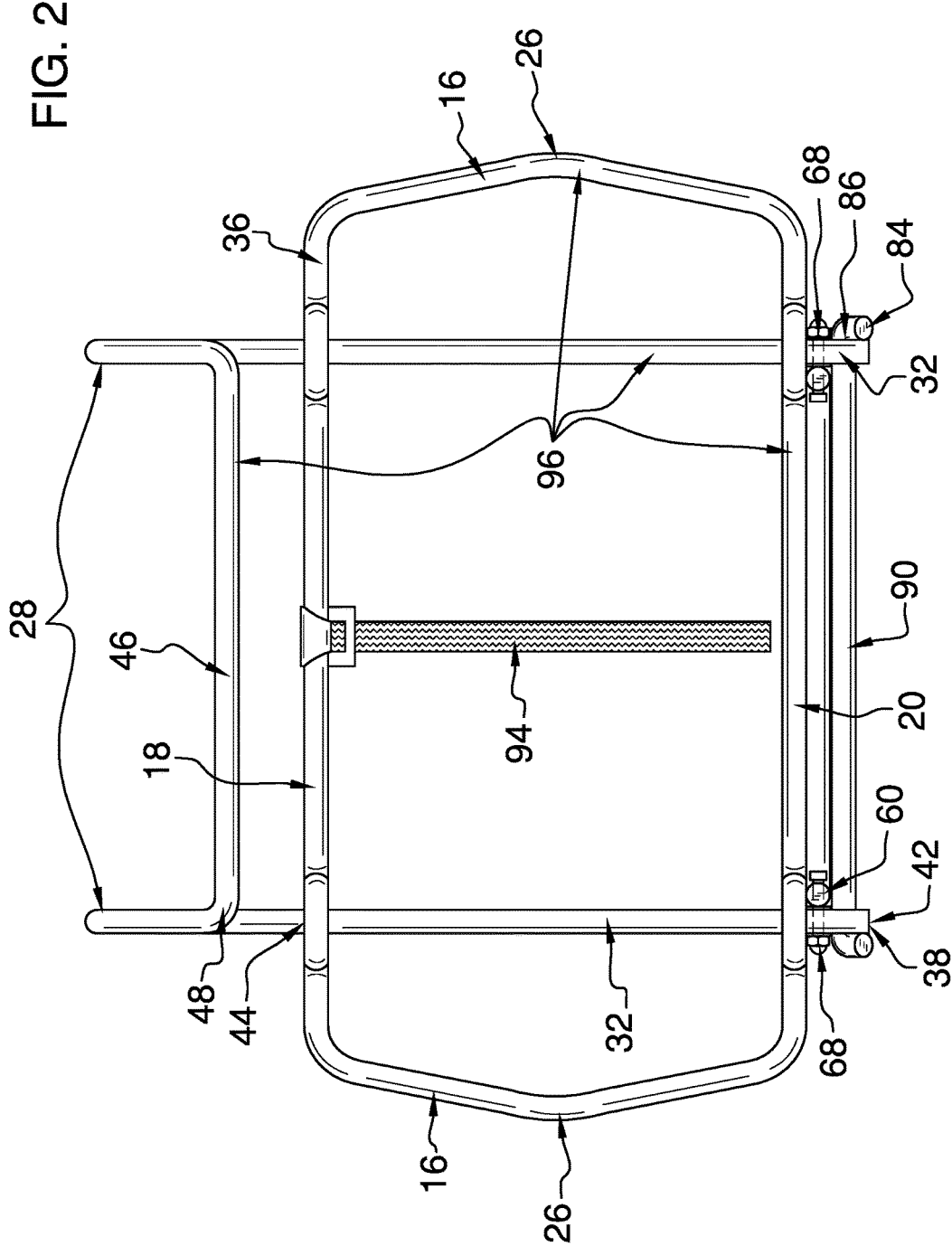
FIG. 2 is a back view of an embodiment of the disclosure.
Figure 3:
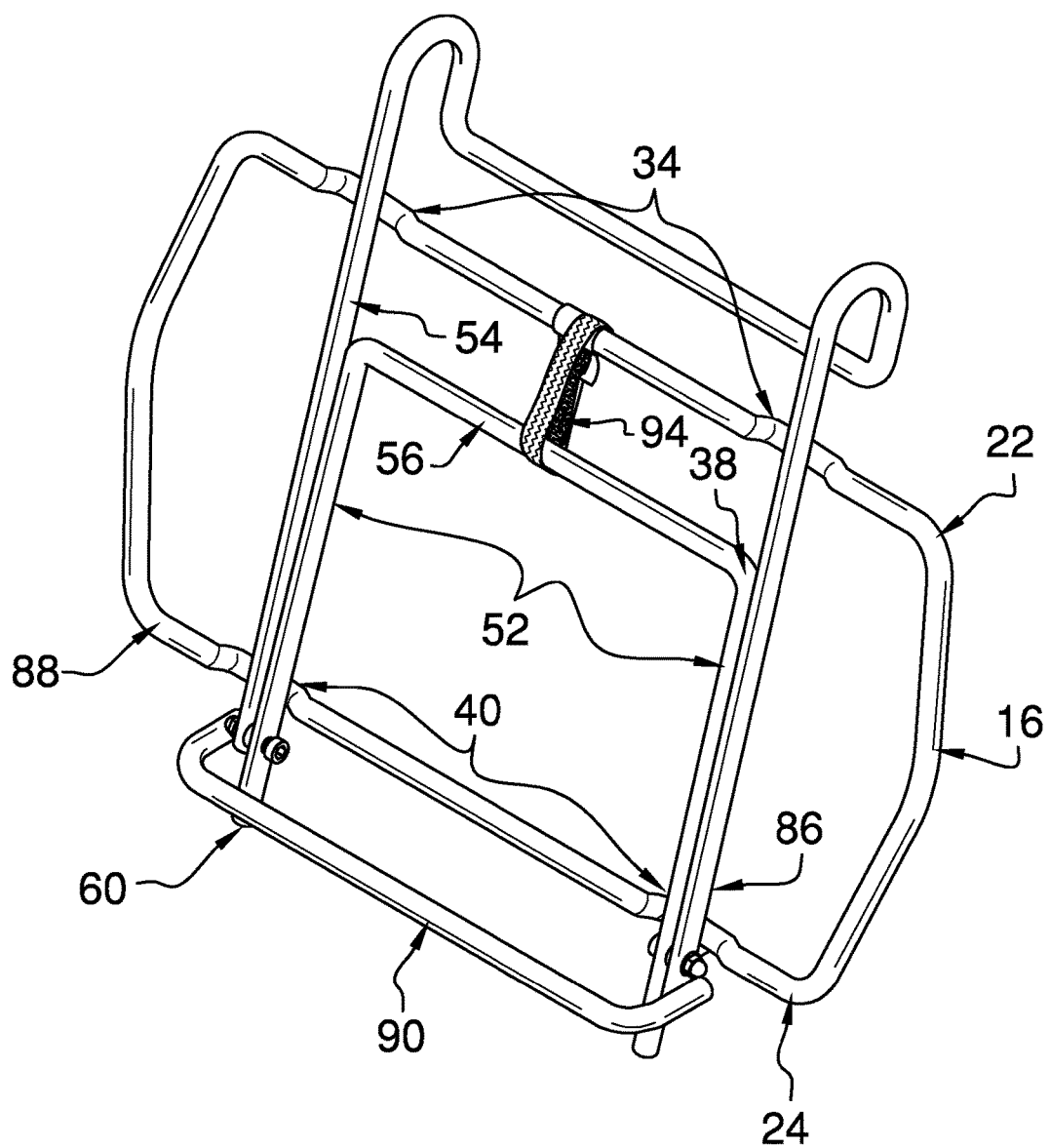
FIG. 3 is an isometric perspective view of an embodiment of the disclosure.
Figure 4:
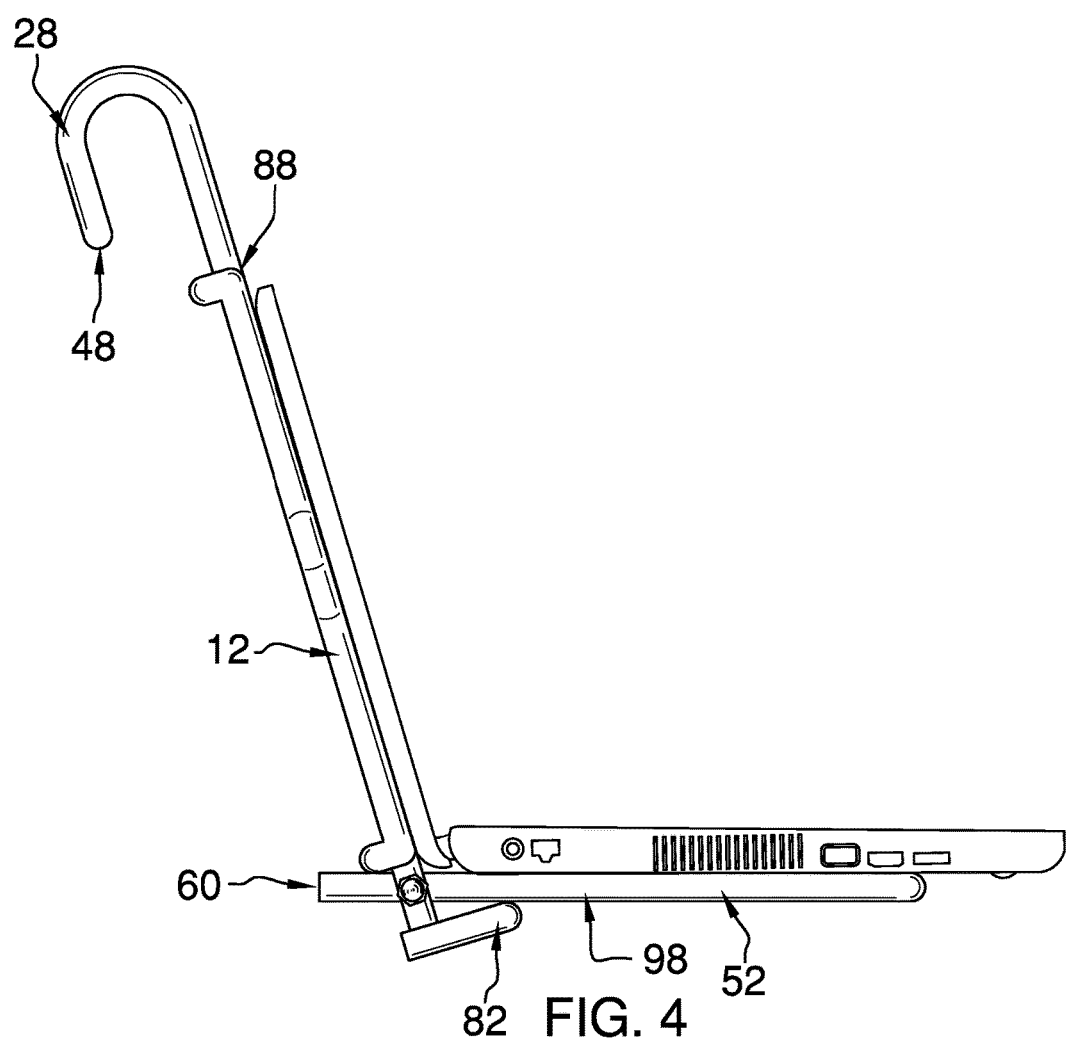
FIG. 4 is a side view of an embodiment of the disclosure.
Figure 5:
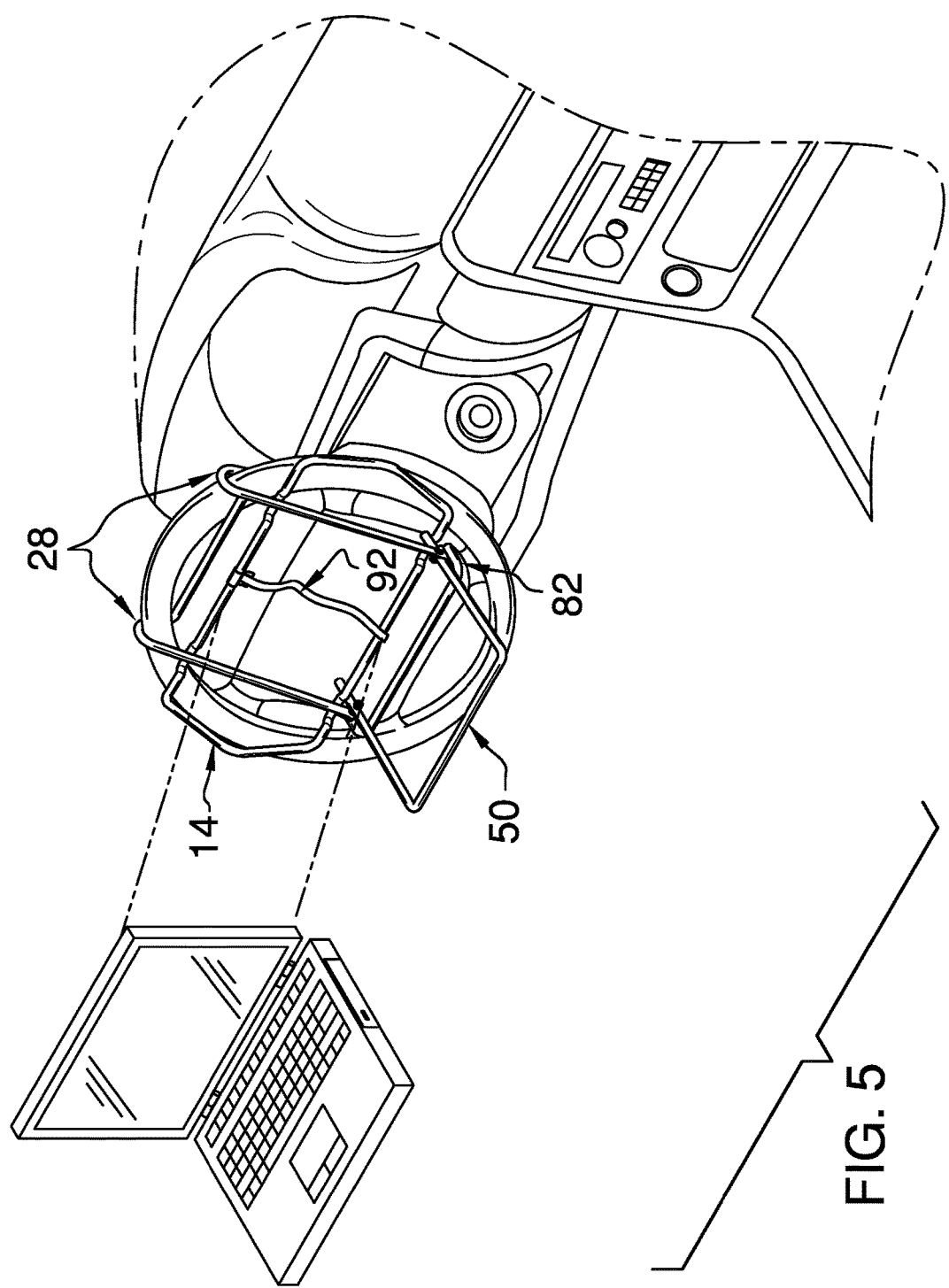
FIG. 5 is an in-use view of an embodiment of the disclosure.

With reference now to the drawings, and in particular to FIGS. 1 through 5 thereof, a new support assembly embodying the principles and concepts of an embodiment of the disclosure and generally designated by the reference numeral 10 will be described.

As best illustrated in FIGS. 1 through 5, the computer support assembly 10 generally comprises a frame 12 disposable upon a wheel of a steering wheel. Opposing side edges 14 of the frame 12 are configured to abut opposing sides of the wheel. The frame 12 is substantially rectangularly shaped. The frame 12 comprises opposing side members 16, a top member 18 and a bottom member 20. The top member 18 is coupled to and extends between upper ends 22 of the opposing side members 16. The bottom member 20 is coupled to and extends between lower ends 24 of the opposing side members 16. The bottom member 20 is substantially parallel to the top member 18.

Each opposing side member 16 comprises a bend 26 positioned substantially equally distant from the upper end 22 and the lower end 24. The bends 26 are in opposition, such that the bends 26 are configured to abut the opposing sides of the wheel.

A pair of hooks 28 is coupled to and extends transversely from an upper edge 30 of the frame 12. The hooks 28 are configured to reversibly couple to a top of the wheel. The hooks 28 are arcuate.

Each of a pair of rods 32 is coupled to and extends between the top member 18 and the bottom member 20 of the frame 12. The pair of rods 32 is substantially parallel. Each rod 32 is positioned proximate to a respective opposing side member 16 of the frame 12.

Each of a pair of first offsets 34 is positioned in the top member 18 proximate to a respective the opposing side member 16 of the frame 12. The first offsets 34 extend from a back 36 of the frame 12. Each first offset 34 is substantially dimensionally equivalent to a diameter 38 of the rod 32. Each of a pair of second offsets 40 is positioned in the bottom member 20 proximate to the respective the opposing side member 16 of the frame 12. The second offsets 40 extend from the back 36 of the frame 12. Each second offset 40 is substantially dimensionally equivalent to the diameter 38 of the rod 32. Each rod 32 is positioned in a respective first offset 34 and a respective second offset, such that the pair of rods 32 and the frame 12 are substantially coplanar. Each rod 32 extends past the bottom member 20 defining a bottom end 42 of the rod 32.

In one embodiment, each hook 28 extends from a top end 44 of a respective rod 32. A cross support 46 is coupled to and extends between the hooks 28. The cross support 46 extends from a terminus 48 of each hook 28. The terminus 48 is distal from the top end 44 of the respective rod 32.

A tray 50 is hingedly coupled to a lower edge 62 of the frame 12. The tray 50 comprises a pair of swing arms 52 that is pivotally coupled singly to the pair of rods 32 proximate to the bottom ends 42. Each swing arm 52 is positioned on an inside face 54 of the respective rod 32. A cross arm 56 is coupled to and extends between the swing arms 52 distal from the rods 32 defining first ends 58 of the swing arms 52. The pair of swing arms 52 is dimensioned such that second ends 60 of the swing arms 52 extend past the back 36 of the frame 12 when the tray 50 is positioned transversely from the frame 12, wherein the swing arms 52 contact the lower edge 62 of the frame 12.

Each of a pair of first channels 64 is positioned through the respective rod 32 proximate to the bottom end 42. Each of a pair of second channels 66 is positioned through a respective swing arm 52 proximate to the second end 60. The second channels 66 are complementary to the first channels 64. Each of a pair of connectors 68 is positioned through a respective first channel 64 and an associated second channel 66, such that the connectors 68 are positioned to hingedly couple the tray 50 to the rods 32.

Each connector 68 comprises a first washer 70 positioned between the respective rod 32 and the respective swing arm 52. An Allen screw 72 is positioned threaded end 74 first through the second channel 66, the first washer 70 and the first channel 64, such that the threaded end 74 protrudes from the respective rod 32. A second washer 76 is positioned over the threaded end 74 of the Allen screw 72. A nut 78 is coupled to the threaded end 74 of the Allen screw 72. The nut 78 comprises an acorn nut 80.

A stop 82 is coupled proximate to the bottom ends 42 of the rods 32 and extends between the rods 32. The stop 82 is configured to retain the tray 50 in a position transverse from the frame 12. The stop 82 comprises a pair of bars 84 coupled singly to the rods 32 proximate to the bottom ends 42 below the swing arms 52. Each bar 84 is positioned on an outside face 86 of the respective rod 32. Each bar 84 extends transversely from the respective rod 32 past a front 88 of the frame 12. A cross bar 90 is coupled to and extends between the bars 84 distal from the rods 32.

A fastener 92 is coupled to the top member 18 of the frame 12. The fastener 92 is positioned to reversibly couple to the cross arm 56 of the tray 50 such that the tray 50 is securable in a position substantially parallel to the pair of rods 32. The fastener 92 comprises a hook and loop fastener 94.

The frame 12, the rods 32, the hooks 28, the cross support 46, the tray 50 and the stop 82 comprise a rubberized coating 98. The frame 12, the rods 32, the hooks 28, the cross support 46, the tray 50 and the stop 82 comprise tubing 96. The tubing 96 is cross-sectionally circular.

In use, the hooks 28 are positioned on the frame 12 such that the frame 12 is couplable to the wheel. The opposing side edges 14 of the frame 12 abut the opposing sides of the wheel, stabilizing the frame 12. The tray 50 is hingedly coupled to the frame 12 such that the tray 50 is positionable transverse from the frame 12 for use. The tray 50 also is positionable substantially parallel to the frame 12 for storage. The fastener 92 is positioned to reversibly couple to the cross arm 56 of the tray 50 such that the tray 50 is securable for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A computer support assembly comprising:
   a frame disposable upon a wheel of a steering wheel, wherein opposing side edges of said frame are configured to abut opposing sides of the wheel, said frame being substantially rectangularly shaped, said frame comprising
      opposing side members, each said opposing side member comprising a bend positioned substantially equally distant from an upper end of said opposing side member and a lower end of said opposing side member, said bends being in opposition, wherein said bends are configured to abut the opposing sides of the wheel,
      a top member coupled to and extending between said upper ends of said opposing side members, and
      a bottom member coupled to and extending between said lower ends of said opposing side members, said bottom member being substantially parallel to said top member;
   a pair of hooks coupled to and extending transversely from an upper edge of said frame, wherein said hooks are configured to reversibly couple to a top of the wheel;
   a tray hingedly coupled to a lower edge of said frame; and
   wherein said hooks are positioned on said frame such that said frame is couplable to the wheel, wherein said opposing side edges of said frame abut the opposing sides of the wheel stabilizing said frame, wherein said tray is hingedly coupled to said frame such that said tray is positionable transverse from said frame for use, and wherein said tray is positionable substantially parallel to said frame for storage.

2. The assembly of claim 1, further including said hooks being arcuate.

3. A computer support assembly comprising:
   a frame disposable upon a wheel of a steering wheel, wherein opposing side edges of said frame are configured to abut opposing sides of the wheel, said frame being substantially rectangularly shaped, said frame comprising opposing side members,
      a top member coupled to and extending between upper ends of said opposing side members, and
      a bottom member coupled to and extending between lower ends of said opposing side members, said bottom member being substantially parallel to said top member;
   a pair of hooks coupled to and extending transversely from an upper edge of said frame, wherein said hooks are configured to reversibly couple to a top of the wheel;
   a tray hingedly coupled to a lower edge of said frame;
   wherein said hooks are positioned on said frame such that said frame is couplable to the wheel, wherein said opposing side edges of said frame abut the opposing sides of the wheel stabilizing said frame, wherein said tray is hingedly coupled to said frame such that said tray is positionable transverse from said frame for use, and wherein said tray is positionable substantially parallel to said frame for storage; and
   a pair of rods, each said rod being coupled to and extending between said top member and said bottom member of said frame, said pair of rods being substantially parallel, each said rod being positioned proximate to a respective opposing side member of said frame, each said rod extending past said bottom member defining a bottom end of said rod.

4. The assembly of claim 3, further comprising:
   a pair of first offsets, each said first offset being positioned in said top member proximate to a respective said opposing side member of said frame, said first offsets extending from a back of said frame, said first offset being substantially dimensionally equivalent to a diameter of said rod;
   a pair of second offsets, each said second offset being positioned in said bottom member proximate to said respective said opposing side member of said frame, said second offsets extending from said back of said frame, each said second offset being substantially dimensionally equivalent to said diameter of said rod; and each said rod being positioned in a respective said first offset and a respective said second offset, such that said pair of rods and said frame are substantially coplanar.

5. The assembly of claim 4, further including each said hook extending from a top end of a respective said rod.

6. The assembly of claim 5, further including a cross support coupled to and extending between said hooks, said cross support extending from a terminus of each said hook, said terminus being distal from said top end of said respective said rod.

7. The assembly of claim 3, further including said tray comprising:
a pair of swing arms pivotally coupled singly to said pair of rods proximate to said bottom ends, each said swing arm being positioned on an inside face of said respective said rod;
a cross arm coupled to and extending between said swing arms distal from said rods defining first ends of said swing arms; and
wherein said pair of swing arms is dimensioned such that second ends of said swing arms extend past said back of said frame when said tray is positioned transversely from said frame, such that said swing arms contact said lower edge of said frame.

8. The assembly of claim 7, further comprising:
a pair of first channels, each said first channel being positioned through said respective said rod proximate to said bottom end;
a pair of second channels, each said second channel being positioned through a respective said swing arm proximate to said second end, said second channels being complementary to said first channels;
a pair of connectors, each said connector being positioned through a respective said first channel and an associated said second channel; and
wherein connectors are positioned to hingedly couple said tray to said rods.

9. The assembly of claim 8, further including each said connector comprising:
a first washer positioned between said respective said rod and said respective said swing arm;
an Allen screw positioned threaded end first through said second channel, said first washer and said first channel, such that said threaded end protrudes from said respective said rod;
a second washer positioned over said threaded end of said Allen screw; and
a nut coupled to said threaded end of said Allen screw, said nut comprising an acorn nut.

10. The assembly of claim 3, further including a stop coupled proximate to said bottom ends of said rods and extending between said rods, said stop being configured to retain said tray in a position transverse from said frame.

11. The assembly of claim 10, further including said stop comprising:
a pair of bars coupled singly to said rods proximate to said bottom ends below said swing arms, each said bar being positioned on an outside face of said respective said rod, each said bar extending transversely from said respective said rod past a front of said frame; and
a cross bar coupled to and extending between said bars distal from said rods.

12. The assembly of claim 7, further including a fastener coupled to said top member of said frame, wherein said fastener is positioned to reversibly couple to said cross arm of said tray such that said tray is securable in a position substantially parallel to said pair of rods.

13. The assembly of claim 12, further including said fastener comprising a hook and loop fastener.

14. The assembly of claim 10, further including said frame, said rods, said hooks, said cross support, said tray and said stop comprising a rubberized coating.

15. The assembly of claim 10, further including said frame, said rods, said hooks, said cross support, said tray and said stop comprising tubing.

16. The assembly of claim 15, further including said tubing being cross-sectionally circular.

17. A computer support assembly comprising:
a frame disposable upon a wheel of a steering wheel, wherein opposing side edges of said frame are configured to abut opposing sides of the wheel, said frame being substantially rectangularly shaped, said frame comprising:
opposing side members,
a top member coupled to and extending between upper ends of said opposing side members,
a bottom member coupled to and extending between lower ends of said opposing side members, said bottom member being substantially parallel to said top member, and
each said opposing side member comprising a bend positioned substantially equally distant from said upper end and said lower end, said bends being in opposition, wherein said bends are configured to abut the opposing sides of the wheel;
a pair of hooks coupled to and extending transversely from an upper edge of said frame, wherein said hooks are configured to reversibly couple to a top of the wheel, said hooks being arcuate,
a pair of rods, each said rod being coupled to and extending between said top member and said bottom member of said frame, said pair of rods being substantially parallel, each said rod being positioned proximate to a respective opposing side member of said frame;
a pair of first offsets, each said first offset being positioned in said top member proximate to a respective said opposing side member of said frame, said first offsets extending from a back of said frame, said first offset being substantially dimensionally equivalent to a diameter of said rod;
a pair of second offsets, each said second offset being positioned in said bottom member proximate to said respective said opposing side member of said frame, said second offsets extending from said back of said frame, each said second offset being substantially dimensionally equivalent to said diameter of said rod;
each said rod being positioned in a respective said first offset and a respective said second offset, such that said pair of rods and said frame are substantially coplanar;
each said rod extending past said bottom member defining a bottom end of said rod;
each said hook extending from a top end of a respective said rod;
a cross support coupled to and extending between said hooks, said cross support extending from a terminus of each said hook, said terminus being distal from said top end of said respective said rod;
a tray hingedly coupled to a lower edge of said frame, said tray comprising:

a pair of swing arms pivotally coupled singly to said pair of rods proximate to said bottom ends, each said swing arm being positioned on an inside face of said respective said rod, a cross arm coupled to and extending between said swing arms distal from said rods defining first ends of said swing arms, wherein said pair of swing arms is dimensioned such that second ends of said swing arms extend past said back of said frame when said tray is positioned transversely from said frame, such that said swing arms contact said lower edge of said frame, a pair of first channels, each said first channel being positioned through said respective said rod proximate to said bottom end, a pair of second channels, each said second channel being positioned through a respective said swing arm proximate to said second end, said second channels being complementary to said first channels, a pair of connectors, each said connector being positioned through a respective said first channel and an associated said second channel, wherein connectors are positioned to hingedly couple said tray to said rods, each said connector comprising:
  a first washer positioned between said respective said rod and said respective said swing arm,
  an Allen screw positioned threaded end first through said second channel, said first washer and said first channel, such that said threaded end protrudes from said respective said rod,
  a second washer positioned over said threaded end of said Allen screw,
  a nut coupled to said threaded end of said Allen screw, said nut comprising an acorn nut;

a stop coupled proximate to said bottom ends of said rods and extending between said rods, said stop being configured to retain said tray in a position transverse from said frame, said stop comprising:
  a pair of bars coupled singly to said rods proximate to said bottom ends below said swing arms, each said bar being positioned on an outside face of said respective said rod, each said bar extending transversely from said respective said rod past a front of said frame, and
  a cross bar coupled to and extending between said bars distal from said rods;

a fastener coupled to said top member of said frame, wherein said fastener is positioned to reversibly couple to said cross arm of said tray such that said tray is securable in a position substantially parallel to said pair of rods, said fastener comprising a hook and loop fastener;

said frame, said rods, said hooks, said cross support, said tray and said stop comprising a rubberized coating;

said frame, said rods, said hooks, said cross support, said tray and said stop comprising tubing; said tubing being cross-sectionally circular; and wherein said hooks are positioned on said frame such that said frame is couplable to the wheel, wherein said opposing side edges of said frame abut the opposing sides of the wheel stabilizing said frame, wherein said tray is hingedly coupled to said frame such that said tray is positionable transverse from said frame for use, and wherein said tray is positionable substantially parallel to said frame for storage.

* * * * *